United States Patent [19]
Saito et al.

[11] Patent Number: 6,110,993
[45] Date of Patent: Aug. 29, 2000

[54] THERMOSETTING EPOXY RESIN COMPOSITION

[75] Inventors: Atsushi Saito, Takatsuki; Tatsuya Okuno, Kurita-gun, both of Japan

[73] Assignee: Sunstar Giken Kabushiki Kaisha, Takatsuki, Japan

[21] Appl. No.: 09/043,824

[22] PCT Filed: Sep. 27, 1996

[86] PCT No.: PCT/JP96/02808

§ 371 Date: Mar. 27, 1998

§ 102(e) Date: Mar. 27, 1998

[30] Foreign Application Priority Data

Sep. 27, 1995 [JP] Japan ................................. 7-249436

[51] Int. Cl.$^7$ ....................................................... C08K 9/10
[52] U.S. Cl. .......................... 523/211; 523/442; 525/107; 525/121; 528/94
[58] Field of Search .................................... 523/211, 442; 525/107, 121; 528/94

[56] References Cited

U.S. PATENT DOCUMENTS 5,218,015  6/1993  Yasuda et al. .......................... 523/210

FOREIGN PATENT DOCUMENTS 58-083023  5/1983  Japan .

*Primary Examiner*—Robert Dawson
*Assistant Examiner*—D. Aylward
*Attorney, Agent, or Firm*—Jacobson, Price, Holman & Stern, PLLC

[57] ABSTRACT

The present invention provides a thermosetting epoxy resin composition which copes with both storage stability and curing properties at a low temperature. A thermosetting epoxy resin composition of the present invention comprises (A) an epoxy resin, and (B) a fine powder-treated curing agent which comprises a curing agent in the solid state at room temperature, and particle surfaces of which are adhered with a fine powder having a center particle size of 2 $\mu$m or less in a weight ratio of said solid curing agent to said fine powder in the range between 1:0.001 to 1:0.7, for hiding active sites on the surface of the curing agent. This composition is useful as an adhesive, a sealant, a coating material, a paint, a potting material, and a molding material.

8 Claims, No Drawings

THERMOSETTING EPOXY RESIN COMPOSITION

FIELD OF THE INVENTION

The present invention relates to a thermosetting epoxy resin composition. In particular, the present invention relates to a thermosetting epoxy resin composition comprising an epoxy resin and a curing agent that is surface treated by a specific method and is in the solid state at room temperature, which composition is useful as an adhesive, a sealant, a coating material, a paint, a potting material, and a molding material, and copes with both the storage stability in a sealed container and curing properties at a low temperature.

BACKGROUND ART

Epoxy resins are used in the fields of adhesives, sealants, coating materials, paints, potting materials, molding materials and the like, and most of them are two-pack types. However, since storage or handling of the two-pack type compositions are troublesome, and their pot life is limited, many restrictions are imposed on their application conditions, and they may not be used effectively.

Thus, some one-pack type epoxy resin compositions have been proposed. The known one-pack type compositions are mainly thermosetting ones, and contain $BF_3$-amine complexes, dicyandiamide, dibasic acid hydrazide, imidazole compounds and the like, as latent curing agents. Among such latent curing agents, those having good storage stability in sealed containers (in particular at 40° C.) require high temperature (generally from 150 to 215° C.) for curing, while those which can be cured at a relatively low temperature, for example, from 60 to 120° C., have low storage stability. Thus, only few compositions satisfy the storage stability and curing properties at a low temperature at a practical level.

To overcome such drawbacks, following compositions have been proposed:

i) a composition comprising an amine-adduct curing agent, ii) a composition comprising a curing agent in the form of microcapsules which are dispersed in an epoxy resin, iii) a composition comprising a curing agent which is adsorbed on molecular sieves for preventing the contact of the curing agent with an epoxy resin.

These one-pack compositions i), ii) and iii) still have technical problems for practically using them, apart from the costs. For example, with the composition i), when the amine-adduct curing agent is solely used, the composition has low adhesion strength, and thus it is not suitable as a one-pack type composition. With the composition ii), the stability of capsules is insufficient. With the composition iii), the composition is unstable against water, and does not have sufficient storage stability.

Accordingly, it has been highly desired to provide a latent curing agent which can cope with both good storage stability, and quick curing properties (in the range between several minutes and 2 hours) at a low temperature (for example, 60 to 120° C.), and which is suitable for a one-pack type epoxy resin composition. That is, the storage stability is important for determining the commercial value of the composition, while the curing properties at a low temperature are valuable properties for saving energy and natural resources. Therefore, it is highly desired to cope with both these properties.

DESCRIPTION OF THE INVENTION

The present inventors have made studies for solving such problems, and found that, when the specific amount of a fine powder having a specific center particle size is adhered to the surface of a curing agent which is in the solid state at room temperature for hiding active sites on the surface, the curing agent can be easily dispersed in epoxy resins in a stable state, and achieve good storage stability of the composition, and further the curing agent the surface of which is covered with the fine powder melts under low temperature conditions, for example, at a temperature of between 60 and 120° C. for several minutes to 2 hours, so that the active sites are exposed for inducing the curing of the resin. Thus, the present invention has been completed.

Accordingly, the present invention provides a thermosetting curable epoxy resin composition comprising (A) an epoxy resin, and (B) a fine powder-treated curing agent which comprises a curing agent in the solid state at room temperature, and particle surfaces of which are adhered with a fine powder having a center particle size of 2 μm or less in a weight ratio of said solid curing agent to said fine powder in the range between 1:0.001 to 1:0.7, for hiding active sites on the surface of the curing agent.

The epoxy resin used as the component (A) according to the present invention may be any conventional epoxy resins. Examples of the epoxy resin are glycidyl ether type epoxy resins which are prepared by the reaction of epichlorohydrin with polyhydric phenols such as bisphenol A, bisphenol F. bisphenol S, hexahydrobisphenol A, tetramethylbisphenol A, pyrocatechol, resorcinol, cresol novolak, tetrabromobisphenol A, trihydroxybiphenyl, bisresorcinol, bisphenolhexafluoroacetone, tetramethylbisphenol F, bixylenol, etc.; polyglycidyl ether type epoxy resins which are prepared by the reaction of epichlorohydrine with polyhydric aliphatic alcohols such as glycerol, neopentyl glycol, ethylene glycol, propylene glycol, butylene glycol, hexylene glycol, polyethylene glycol, polypropylene glycol, etc.; glycidyl ether ester type epoxy resins which is prepared by the reaction of epichlorohydrin with hydroxycarboxylic acids such as p-oxybenzoic acid, β-oxynaphthoic acid, etc.; polyglycidyl ester type epoxy resins which are derived from polybasic carboxylic acids such as phthalic acid, methylphthalic acid, isophthalic acid, terephthalic acid, tetrahydrophthalic acid, hexahydrophthalic acid, endomethylenetetrahydrophthalic acid, endomethylenehexahydrophthalic acid, trimellitic acid, polymeric aliphatic acids, etc.; glycidyl aminoglycidyl ether type epoxy resins which are derived from aminophenol, aminoalkylphenols, etc.; glycidyl aminoglycidyl ester type epoxy resins which are derived from aminobenzoic acid, etc.; glycidylamine type epoxy resins which are derived from aniline, toluidine, tribromoaniline, xylylenediamine, diaminocyclohexane, bisaminomethylcyclohexane, 4,4'-diaminodiphenylmethane, 4,4'-diaminodiphenylsulfone, etc.; epoxydized polyolefins, glycidyl hydantoin, glycidyl alkylhydantoins, triglycidyl cyanurate, etc.; monoepoxy compounds such as butyl glycidyl ether, phenyl glycidyl ether, alkylphenyl glycidyl ethers, glycidyl benzoate, styrene oxide, etc.; and the like. They may be used independently or in admixture of two or more of them.

Examples of the curing agent which is in the solid state at room temperature (hereinafter referred to as "solid curing agent") are imidazole compounds (e.g. imidazole, 2-methylimodazole, 2-ethylimidazole, 2-ethyl-4-methylimidazole, 2-isopropylimidazole, 2-phenylimidazole, 2-dodecylimidazle, 2-undecylimidazole, 2-heptadecylimidazole, their carboxylic acid salts with acetic acid, lactic acid, salicylic acid, benzoic acid, adipic acid, phthalic acid, citric acid, tartaric acid, maleic acid, trimellitic acid, etc.); imidazoline compounds (e.g.

2-methylimidazoline, 2-phenylimidazoline, 2-undecylimidazoline, 2-heptadecylimidazoline, 1-(2-hydroxy-3-phenoxypropyl)-2-phenylimidazoline, 1-(2-hydroxy-3-butoxypropyl)-2-methylimidazoline, etc.); amines (e.g. aromatic amines such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, 3,4-tolylenediamine, etc., and aliphatic amines such as 1,12-dodecanediamine, 1,10-decanediamine, 1,8-octanediamine, 1,14-tetradecanediamine, 1,16-hexadecanediamine, etc.); guanidine compounds (e.g. dicyandiamide, etc.); carboxylic acids and their anhydrides (e.g. phthalic acid, tetrahydrophthalic acid, hexahydrophthalic acid, methylated hexahydrophthalic acid, trimellitic acid, and their anhydrides); dibasic acid hydrazides (e.g. adipic acid dihydrazide, sebacic acid dihydrazide, etc.); guanamine compounds (e.g. benzoguanamine, etc.); melamine; amine adducts (e.g. adducts of 2-ethyl-4-methylimidazole and bisphenol A epoxy resin, etc.); and the like. They may be used independently or in admixture of two or more of them.

These solid curing agents exhibit their curing behavior functions when they are in a molten state at a temperature higher than their melting points, or under heating conditions at specific temperature, and their center particle size is adjusted at 20 $\mu$m or less, preferably between 3 and 15 $\mu$m. When the center particle size exceeds 20 $\mu$m, the curing rate decreases, and the physical properties of cured materials tend to deteriorate.

The fine powder-treated curing agent as the component (B) according to the present invention can be prepared by a shear frictional mixing method by which the above solid curing agent is ground for having the determined center particle size, while the fine powder is added for adhering the powder to the particle surface of the solid curing agent. Alternatively, the fine powder-treated curing agent can be prepared by mixing the preground solid curing agent and the fine powder with a high speed impact type mixing apparatus (e.g. a jet mill) or a compression shear type mixing apparatus. This method is preferable. In particular, the mixing with the high speed impact type mixing apparatus is preferable.

As the fine powder, any inorganic or organic powder can be used. Examples of the inorganic powder are titanium oxide, calcium carbonate, clay, silica, zirconia, carbon, alumina, talc, and the like, and examples of the organic powder are polyvinyl chloride, polyacrylic resins, polystyrene, polyethylene, and the like. They may be used independently or in admixture of two or more of them.

The amount of the fine powder is selected so that the weight ratio of the solid curing agent to the fine powder is between 1:0.001 to 1:0.7, preferably between 1:0.002 to 1:0.4. When the ratio of the fine powder is less than 0.001, the effect for improving the storage stability is not attained. If the ratio of the fine powder exceeds 0.7, the storage stability will not be further improved.

When the solid curing agent and fine powder are mixed and ground, the fine powder adheres to the surface of the solid curing agent with generated static electricity, or the solid curing agent is partially molten by the heat generated through friction, impact and compression shear which are generated by the mechanical force of a mixing apparatus and then the fine powder adheres to the molten surface of the curing agent, or the fine powder particles are physically anchored or embedded in the surface of the solid curing agent. Furthermore, it may be contemplated that the curing agent and fine powder are chemically activated and they adhere each other. In any case, the active sites on the surface of the solid curing agent are covered with the fine powder.

The types of the active sites depend on the kinds of the curing agents. The active sites are NH= groups in the rings of the imidazole and imidazoline compounds; primary, secondary and tertiary amino groups ($-HN_2$, $=NH$ and $\equiv N$) for the amine compounds, dibasic acid hydrazides, guanamines, melamine and amine adducts; and carboxyl groups (COOH) for the carboxylic acids and their anhydrides.

It is important for the fine powder to have a center particle size of 2 $\mu$m or less, preferably 1 $\mu$m or less. When the center particle size exceeds 2 $\mu$m, the fine powder may be less adhered to the surface of the solid curing agent.

The active sites on the surface of the curing agent are deactivated by the above treatment with the fine powder. The remaining active sites may be further deactivated by the reaction with a liquid isocyanate compound (usually at a temperature lower than the melting point of the curing agent).

Examples of the liquid isocyanate compound are crude MDI (diphenylmethane-4,4'-diisocyanate), p-toluenesulfonyl isocyanate, isophorone diisocyanate, TDI (toluene diisocyanate), n-octadecyl isocyanate, and the like. The content of the liquid isocyanate compound is selected so that an equivalent ratio of the active sites of the solid curing agent to the NCO groups is between 1:0.01 and 1:0.5. The deactivation treatment with the liquid isocyanate compound further improves the storage stability in comparison with the covering treatment with the fine powder.

When the amount of the NCO groups is less than 0.01 in the above equivalent ratio, the effect for improving the storage stability is not attained. When the amount of the NCO groups exceeds 0.5 in the above equivalent ratio, the further improvement of the storage stability may not be expected.

The fine powder-treated curing agent (B), which has been covered with the fine powder and optionally deactivated with the liquid isocyanate compound, regenerates the active sites at the curing temperature (usually between 60 and 120° C.), and the active sites react with the epoxy groups of the epoxy resin (A). Thus, the epoxy resin is cured.

Accordingly, the amounts of the epoxy resin (A) and the curing agent (B) are selected so that an equivalent ratio of the thermally regenerated active sites to the epoxy groups is between 1:0.5 and 1:2.0, preferably around 1:1.

The thermosetting epoxy resin composition of the present invention comprises the above epoxy resin (A) and the fine powder-treated curing agent (B). If desired, the composition may contain suitable amounts of conventional additives, for example, bulking materials, reinforcing agents, fillers (e.g. coal tar, glass fiber, boron fiber, carbon fiber, cellulose, polyethylene powder, polypropylene powder, quartz powder, mineral silicates, mica, slate powder, kaolin, aluminum oxide trihydrate, aluminum hydroxide, chalk powder, plaster, calcium carbonate, antimony trioxide, bentonite, silica, aerosol, lithopon, baryte, titanium dioxide, carbon black, graphite, iron oxide, gold powder, aluminum powder, iron powder, etc.), pigments, organic solvents (e.g. toluene, xylene, methyl ethyl ketone, methyl isobutyl ketone, ethyl acetate, butyl acetate, etc.), reactive diluents (e.g. butyl glycidyl ether, N,N'-diglycidyl-o-toluidine, phenyl glycidyl ether, styrene oxide, ethylene glycol diglycidyl ether, propylene glycol diglycidyl ether, 1,6-hexanediol diglycidyl ether, etc.), non-reactive diluents (e.g. dioctyl phthalate, dibutyl phthalate, dioctyl adipate, petroleum solvents, etc.), modified epoxy resins (e.g. urethane-modified epoxy resins, rubber-modified epoxy resins, alkyd-modified epoxy resins, etc.), and the like.

BEST MODE FOR CARRYING OUT THE INVENTION

The present invention will be explained more in detail by the following Preparation Examples (preparation of fine powder-treated curing agents), Examples and Comparative Examples. In these Examples, "parts" mean "parts by weight".

Preparation Example 1

1,12-Dodecanediamine (melting point, 71° C.) and titanium oxide having a center particle size of 0.27 $\mu$m are mixed in the weight ratio of 1:0.3, and ground with a jet mill, and a fine powder-treated curing agent having the center particle size of about 10 $\mu$m is obtained.

Preparation Example 2

Dicyandiamide (melting point, 209° C.) and titanium oxide having a center particle size of 0.27 $\mu$m are mixed in the weight ratio of 1:0.3, and ground with a jet mill, and a fine powder-treated curing agent having the center particle size of about 10 $\mu$m is obtained.

Preparation Example 3

An imidazole compound (IMIDAZOLE C. 17Z available from SHIKOKU KASEI Co., Ltd.; melting point, 86–91° C.) and titanium oxide having a center particle size of 0.27 $\mu$m are mixed in the weight ratio of 1:0.3, and ground with a jet mill, and a fine powder-treated curing agent having the center particle size of about 10 $\mu$m is obtained.

Preparation Example 4

1,12-Dodecanediamine (melting point, 71° C.) and hydrophobic silica having a center particle size of 0.02 $\mu$m are mixed in the weight ratio of 1:0.3, and ground with a jet mill, and a fine powder-treated curing agent having the center particle size of about 10 $\mu$m is obtained.

Preparation Example 5

1,12-Dodecanediamine (melting point, 71° C.) and polyvinyl chloride powder having a center particle size of 0.3 $\mu$m are mixed in the weight ratio of 1:0.2, and ground with a jet mill, and a fine powder-treated curing agent having the center particle size of about 10 $\mu$m is obtained.

Example 1

A glycidyl ether type epoxy resin of bisphenol A (EPIKOTE 828 available from YUKA SHELL EPOXY Co., Ltd.) (100 parts), the fine powder-treated curing agent of Preparation Example 1 (37.6 parts) and calcium carbonate as a filler (WHITON SB available from SHIRAISHI CALCIUM Co., Ltd.) (30 parts) are mixed with a chemistirrer, and thus a thermosetting epoxy resin composition is obtained.

Example 2

EPIKOTE 828 (100 parts), the fine powder-treated curing agent of Preparation Example 2 (14.4 parts), the fine powder-treated curing agent of Preparation Example 3 (7.8 parts) and the same filler as that used in Example 1 (30 parts) are mixed with a chemistirrer, and thus a thermosetting epoxy resin composition is obtained.

Example 3

EPIKOTE 828 (100 parts), the fine powder-treated curing agent of Preparation Example 4 (37.6 parts) and the same filler as that used in Example 1 (30 parts) are mixed with a chemistirrer, and thus a thermosetting epoxy resin composition is obtained.

Example 4

EPIKOTE 828 (100 parts), the fine powder-treated curing agent of Preparation Example 5 (37.6 parts) and the same filler as that used in Example 1 (30 parts) are mixed with a chemistirrer, and thus a thermosetting epoxy resin composition is obtained.

Example 5

EPIKOTE 828 (100 parts), the fine powder-treated curing agent of Preparation Example 4 (37.6 parts), a liquid isocyanate compound (ADDITIVE TI available from Bayer AG) (9.0 parts) and the same filler as that used in Example 1 (30 parts) are mixed with a chemistirrer, and thus a thermosetting epoxy resin composition is obtained.

Comparative Example 1

EPIKOTE 828 (100 parts), 1,12-dodecanediamine (26.3 parts) and the same filler as that used in Example 1 (30 parts) are mixed with a chemistirrer, and thus a thermosetting epoxy resin composition is obtained.

Comparative Example 2

EPIKOTE 828 (100 parts), dicyandiamide (11.1 parts), IMIDAZOLE C. 17Z (6 parts) and the same filler as that used in Example 1 (30 parts) are mixed with a chemistirrer, and thus a thermosetting epoxy resin composition is obtained.

PERFORMANCE TESTS (1) Storage stability

The composition obtained in each of Examples 1–5 and Comparative Examples 1 and 2 is stored in a sealed vessel at 40° C., and increased viscosities with time are measured (with the viscosity just prior to the storage being 100). The results are shown in Table 1.

(2) Curing characteristics 1

The composition obtained in each of Examples 1–5 and Comparative Examples 1 and 2 is applied in a lap area of each of a pair of SPCC-SD steel plates (each 1.6 mm×25 mm×100 mm) with a lap length of 12.5 mm, and the plates are adhered. Then, the composition is cured at 120° C. for 20 minutes, and left at room temperature for one hour or more. After that, the shear strength (kg.f/cm$^2$) is measured. The results are shown in Table 1.

(3) Curing characteristics 2

The composition obtained in each of Examples 1–5 and Comparative Examples 1 and 2 is coated on a surface of a hot plate at a film thickness of 200 $\mu$m, and heated at 80° C. for 20 minutes. Then, the cured state of the composition is observed. The cured composition is marked with "O", while the uncured composition is marked with "X". The results are shown in Table 1.

TABLE 1

| | Example No. | | | | | Comp. Ex. No. | |
| --- | --- | --- | --- | --- | --- | --- | --- |
| | 1 | 2 | 3 | 4 | 5 | 1 | 2 |
| (1) Storage stability at 40° C. after: | | | | | | | |
| 1 day | 130 | 120 | 125 | 135 | 120 | Gelled | 180 |
| 7 days | 155 | 140 | 150 | 160 | 140 | — | Gelled |
| 14 days | 180 | 165 | 170 | 185 | 160 | — | — |
| (2) Shear strength 120° C. × 20 min. (kg·f/cm$^2$) | 136 | 245 | 137 | 128 | 135 | 140 | 247 |
| (2) Curing 80° C. × 20 min. | ○ | x | ○ | ○ | ○ | ○ | x |

What is claimed is:

1. A thermosetting curable epoxy resin composition comprising:

(A) an epoxy resin, and (B) a fine powder-treated curing agent which comprises a curing agent in the solid state at room temperature, and particle surfaces of which are adhered with a fine powder having a center particle size of 2 μm or less in a weight ratio of said solid curing agent to said fine powder in the range between 1:0.001 to 1:0.7, for hiding active sites on the surface of the curing agent, said fine powder being at least one powder selected from the group consisting of titanium oxide, calcium carbonate, clay, zirconia, carbon, alumina, talc, polyvinyl chloride, polyacrylic resins, polystyrene, and polyethylene.

2. A thermosetting epoxy resin composition according to claim 1, wherein said curing agent in the solid state at room temperature exhibits curing behavior when it is in a molten state or under heating conditions, and has a center particle size of 20 μm or less, and said curing agent is at least one curing agent selected from the group consisting of imidazole compounds, imidazoline compounds, amines, guanidine compounds, carboxylic acids and their anhydrides, dibasic acid hydrazides, guanamine compounds, melamine, and amine adducts.

3. A thermosetting epoxy resin composition according to claim 1, wherein the amounts of the epoxy resin (A) and the curing agent (B) are selected so that an equivalent ratio of the thermally regenerated active sites of the curing agent to the epoxy groups is between 1:0.5 and 1:2.0.

4. A thermosetting epoxy resin composition according to claim 1, wherein the remaining active sites of the curing agent (B) which has been covered with the fine powder are deactivated by the reaction with a liquid isocyanate compound, and the content of said liquid isocyanate compound is selected so that an equivalent ratio of the active sites of the solid curing agent to the isocyanate groups is between 1:0.01 and 1:0.5.

5. A thermosetting epoxy resin composition according to claim 2, wherein said fine powder is at least one powder selected from the group consisting of titanium oxide, calcium carbonate, clay, zirconia, carbon, alumina, talc, polyvinyl chloride, polyacrylic resins, polystyrene, and polyethylene.

6. A thermosetting epoxy resin composition according to claim 2, wherein the amounts of the epoxy resin (A) and the curing agent (B) are selected so that an equivalent ratio of the thermally regenerated active sites of the curing agent to the epoxy groups is between 1:0.5 and 1:2.0.

7. A thermosetting epoxy resin composition according to claim 2, wherein the remaining active sites of the curing agent (B) which has been covered with the fine powder are deactivated by the reaction with a liquid isocyanate compound, and the content of said liquid isocyanate compound is selected so that an equivalent ratio of the active sites of the solid curing agent to the isocyanate groups is between 1:0.01 and 1:0.5.

8. A thermosetting epoxy resin composition according to claim 3, wherein the remaining active sites of the curing agent (B) which has been covered with the fine powder are deactivated by the reaction with a liquid isocyanate compound, and the content of said liquid isocyanate compound is selected so that an equivalent ratio of the active sites of the solid curing agent to the isocyanate groups is between 1:0.01 and 1:0.5.

* * * * *